United States Patent
Fisch et al.

(10) Patent No.: US 6,551,191 B2
(45) Date of Patent: Apr. 22, 2003

(54) COUPLING APPARATUS

(75) Inventors: Klemens Fisch, Dietikon (CH); Adrian Hof, Olten (CH); Roger Suter, Zürich (CH)

(73) Assignee: Man Turbomaschinen AG (DE)

( * ) Notice: Subject to any disclaimer, the term of this patent is extended or adjusted under 35 U.S.C. 154(b) by 0 days.

(21) Appl. No.: 09/934,009

(22) Filed: Aug. 21, 2001

(65) Prior Publication Data
US 2002/0037772 A1 Mar. 28, 2002

(30) Foreign Application Priority Data
Sep. 22, 2000 (EP) .......................................... 00810875

(51) Int. Cl.⁷ ................................................. H02K 7/09
(52) U.S. Cl. ...................................... 464/182; 310/90.5
(58) Field of Search ........................ 384/420; 310/90.5; 464/182, 98, 147

(56) References Cited

U.S. PATENT DOCUMENTS

| | | | | |
|---|---|---|---|---|
| 3,610,569 A | * | 10/1971 | Reaves | 138/94.3 |
| 3,698,775 A | | 10/1972 | Gilbert | |
| 4,121,532 A | * | 10/1978 | Coryell, III | 464/98 |
| 4,560,364 A | * | 12/1985 | Cohen | 464/99 |
| 4,767,378 A | | 8/1988 | Oberman | |
| 5,310,311 A | * | 5/1994 | Andres et al. | 310/90.5 |
| 5,543,673 A | * | 8/1996 | Katsumata et al. | 310/90.5 |
| 6,255,752 B1 | * | 7/2001 | Werner | 310/90.5 |

FOREIGN PATENT DOCUMENTS

| | | |
|---|---|---|
| DE | 26 58 687 A1 | 7/1977 |
| EP | 0 008 616 A | 3/1980 |

* cited by examiner

Primary Examiner—Lynne H. Browne
Assistant Examiner—K Thompson
(74) Attorney, Agent, or Firm—McGlew and Tuttle, P.C.

(57) ABSTRACT

A coupling apparatus (4) for connecting two rotatable shafts (2a, 3a) of a turbocompressor (1) includes a first and a second coupling part (4a, 4b) which form part of the shaft (2a, 3a) or are designed for firm connection to one end section of the shafts (2a, 3a) each. A third coupling part (4c) is designed in disc-shape and is arranged between the first and the second coupling part (4a, 4b). The first, second and third coupling part (4a, 4b, 4c) are firmly connectable to one another. The third coupling part (4c) has a section (41) which projects beyond the first or second coupling part (4a, 4b) in the radial direction and is designed as a bearing disc of an axial bearing (7).

20 Claims, 4 Drawing Sheets

COUPLING APPARATUS

FIELD OF THE INVENTION

The invention relates to a coupling apparatus connecting two rotatable shafts of a turbocompressor.

BACKGROUND OF THE INVENTION

A bearing apparatus for a turbocompressor is known from the specification DE 26 58 687 A1. This bearing apparatus is suitable in particular for turbo machines which are designed to be very long and which have a plurality of compressor wheels which are arranged adjacently on a common shaft. The rotor shaft of this known bearing apparatus is completely electromagnetically journalled by means of electromagnetic radial bearings as well as an electromagnetic axial bearing. It is disadvantageous in this known bearing apparatus that the axial bearings have a low carrying force. In particular when a plurality of compressor wheels are arranged on the bearing shaft, relatively large force variations can arise in the axial direction, through which the known bearing apparatus could be overloaded or damaged. Further disadvantageous in the known bearing apparatus is that the axial bearing can have an unfavorable effect on the rotor-dynamic behavior of the shaft.

SUMMARY AND OBJECTS OF THE INVENTION

The object of the present invention is to create an apparatus for a turbocompressor which enables a more advantageous operation.

According to the invention, a coupling apparatus for connecting two rotatable shafts of a turbocompressor includes a first and a second coupling part which are designed for firm connection to one end section of the shafts each, as well as comprising a third coupling part which is designed in disc-shape and which is to be arranged between the first and the second coupling part. The first, second and third coupling part are firmly connectable to one another. The third coupling part has a section which projects beyond the first or second coupling part in the radial direction and which is designed as a bearing disc of an axial bearing.

The coupling apparatus in accordance with the invention has the further advantage that the bearing disc can be designed to be relatively large radially in order to produce a large force in the axial direction with the electromagnetic axial bearing. Due to the high speed of rotation of a turbocompressor, large radial forces or large centrifugal forces respectively arise at a heavy bearing disc or at a bearing disc with relative large diameter respectively. The coupling apparatus in accordance with the invention permits the bearing disc to be designed in such a manner that it is suitable for high speeds of rotation, for example for a peripheral speed of 400 m/s. In a preferred embodiment the bearing disc is designed as a through-going bearing disc, without a bore in its center. In addition the bearing disc is preferably forged. A bearing disc which is designed in this manner has the required material properties in order also to be operated safely at high speeds of rotation. In a further, advantageous embodiment the bearing disc is designed to become thinner outwardly in order to reduce its mass and thereby to achieve a constructional shape which is optimized in regard to stress.

The shaft of a turbocompressor has large radial deflections in particular in the region of the first, second, third or fourth critical resonance frequency, with the shaft developing oscillation bulges and oscillation nodes in its direction of extent. An advantage of the coupling apparatus in accordance with the invention is that through the shortening of the constructional length which results from the integration of the axial bearing disc into the coupling, a better possibility of influencing the rotor dynamics can be achieved.

The invention will be explained in the following with reference to a plurality of exemplary embodiments, with identical reference symbols relating to identical objects.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
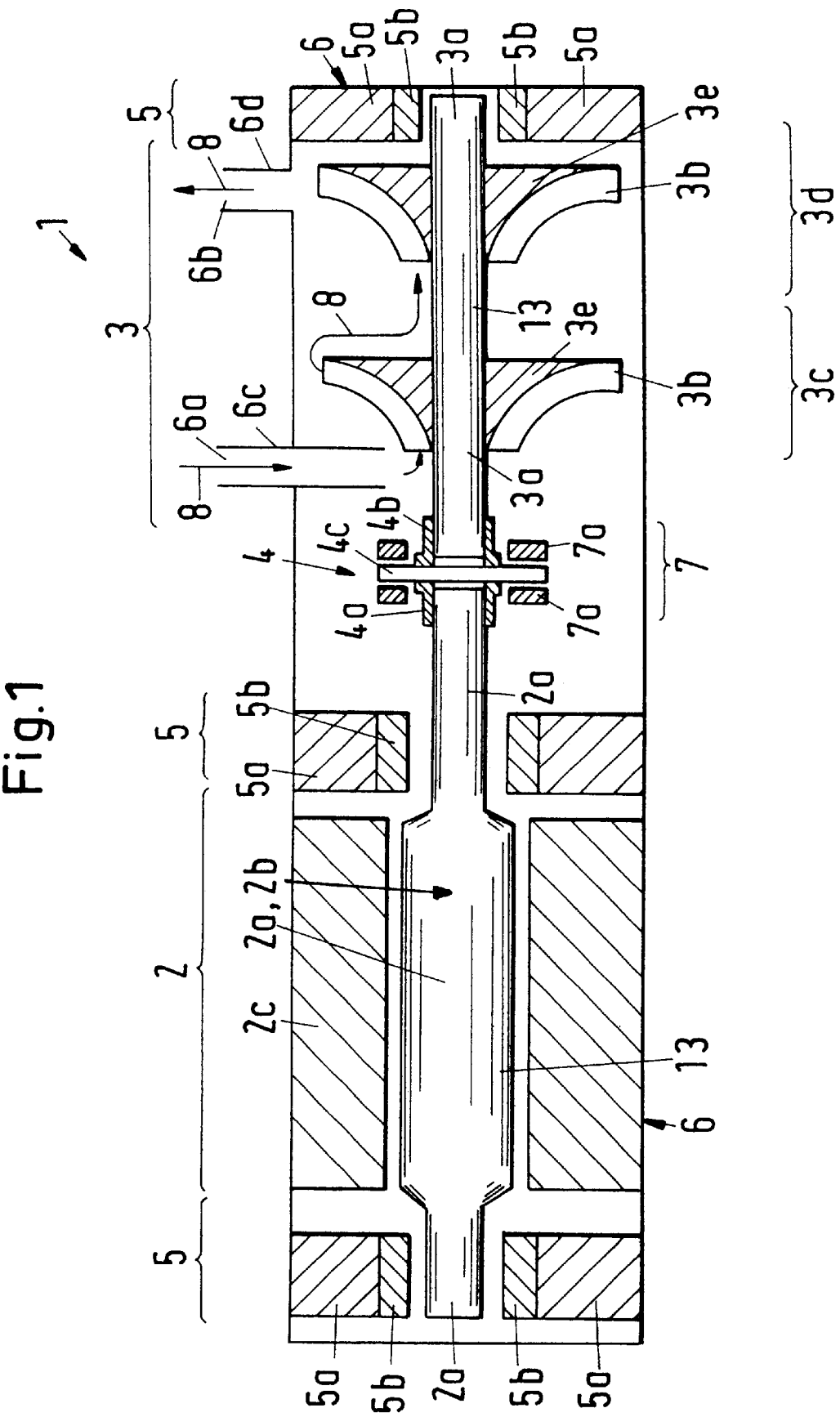
FIG. 1 is a longitudinal sectional view of a turbocompressor with an electric motor, a radial turbocompressor and a coupling apparatus.

Referring to the drawings in particular, FIG. 1 shows schematically a turbocompressor which comprises a radial turbocompressor 3 with a shaft 3a and a driving electric motor 2 with a shaft 2a. The two shafts 2a, 3a are connected to one another via a coupling 4 comprising three coupling parts 4a, 4b, 4c, so that the electric motor 2 drives the shaft 3a of the radial turbocompressor 3 via the shaft 2a and the coupling 4. The two shafts 2a, 3a are journalled through three electromagnetic radial bearings 5. The coupling 4 comprises a first coupling part 4a, a second coupling part 4b as well as a third coupling part 4c which is arranged between them and which at the same time forms the bearing disc of the axial bearing 7, for which reason electromagnets 7c comprising electromagnetic coils 7a are arranged directly adjacently to the coupling part 4c in order thus to form an electromagnetic axial bearing 7.

The turbocompressor 1 which is illustrated in FIG. 1 comprises a hermetically sealed pressure housing 6 within which the electric motor 2 and the radial turbocompressor 3 are arranged. An inlet line 6c and an outlet line 6d which pass through the pressure housing 6 connect the radial turbocompressor 3 in a fluid conducting manner to an apparatus which is located outside the pressure housing 6 or to a process which is running outside the pressure housing. The electric motor 2 comprises the rotor 2b and the stator 2c, with the rotor 2b forming part of the motor shaft 2a. The motor shaft 2a is journalled in the radial direction at both sides in the electromagnetic radial bearing 5, comprising a support apparatus 5a and an electromagnetic coil 5b each. The motor shaft 2a is connected at its one end section via a coupling 4 to the end section of the rotor 3a of the radial turbocompressor 3. In addition to the coupling 4 the electromagnetic axial bearing 7 is also arranged at the connection location between the motor shaft 2a and the compressor shaft 3a. The motor shaft 2a and the rotor 3a form a common shaft. Two compressor wheels 3b, which form a first compressor stage 3c and a second compressor stage 3d, are arranged in the direction of extent of the rotor 3a. Not illustrated are the guide blades or the diffusor respectively of the radial turbocompressor 3. The main mass flow 8 of the fluid to be compressed, preferably in the form of a gas, enters via the inlet opening 6a and the inlet line 6c into the first compressor stage 3c, is then conducted to the second compressor stage 3d and is then conducted via the outlet line 6d to the outlet opening 6b.

The turbocompressor 1 could also have a plurality of compressor wheels 3b which are arranged with spacing in the direction of extent of the rotor 3a, thus for example a total of three, four, five, six, seven, eight, nine or ten compressor wheels 3b. The compression pressure which is to be achieved is largely open upwardly, with a compression pressure of for example 600 bar being achievable through a corresponding number of compressor wheels 3b which are connected in series. The turbocompressor 1 could also comprise one or more further radial turbocompressors 3 and/or electric motors 2 which are arranged in the direction of extent of the rotor 3a; 2a, with all rotors 3a; 2a forming a common shaft. This common shaft could be journalled through radial bearings, in particular magnetic radial bearings 5, with a single radial bearing 5 preferably being arranged between each radial turbocompressor 3. All radial turbocompressors 3 are preferably arranged together with the electric motor 2 or the electric motors 2 in a common, single pressure housing 6.

The electromagnetic radial bearings 5 and the sections of the shafts 2a and 3a which are associated with the radial bearings 5 have further components, which are obvious for the expert and therefore are not illustrated, in order to form an electromagnetic radial bearing 5, such as electrical coils, ferromagnetic parts etc. The same holds for the electric motor 2, which is likewise only schematically illustrated.

Relatively large forces can arise at the common shaft 2a, 3a during the operation of the turbocompressor 1 which is illustrated in FIG. 1. The coupling apparatus 4 in accordance with the invention enables the formation of an electromagnetic axial bearing 7 with a relatively large bearing disc 4c, which allows large axial bearing forces to be produced.

Figure 2:
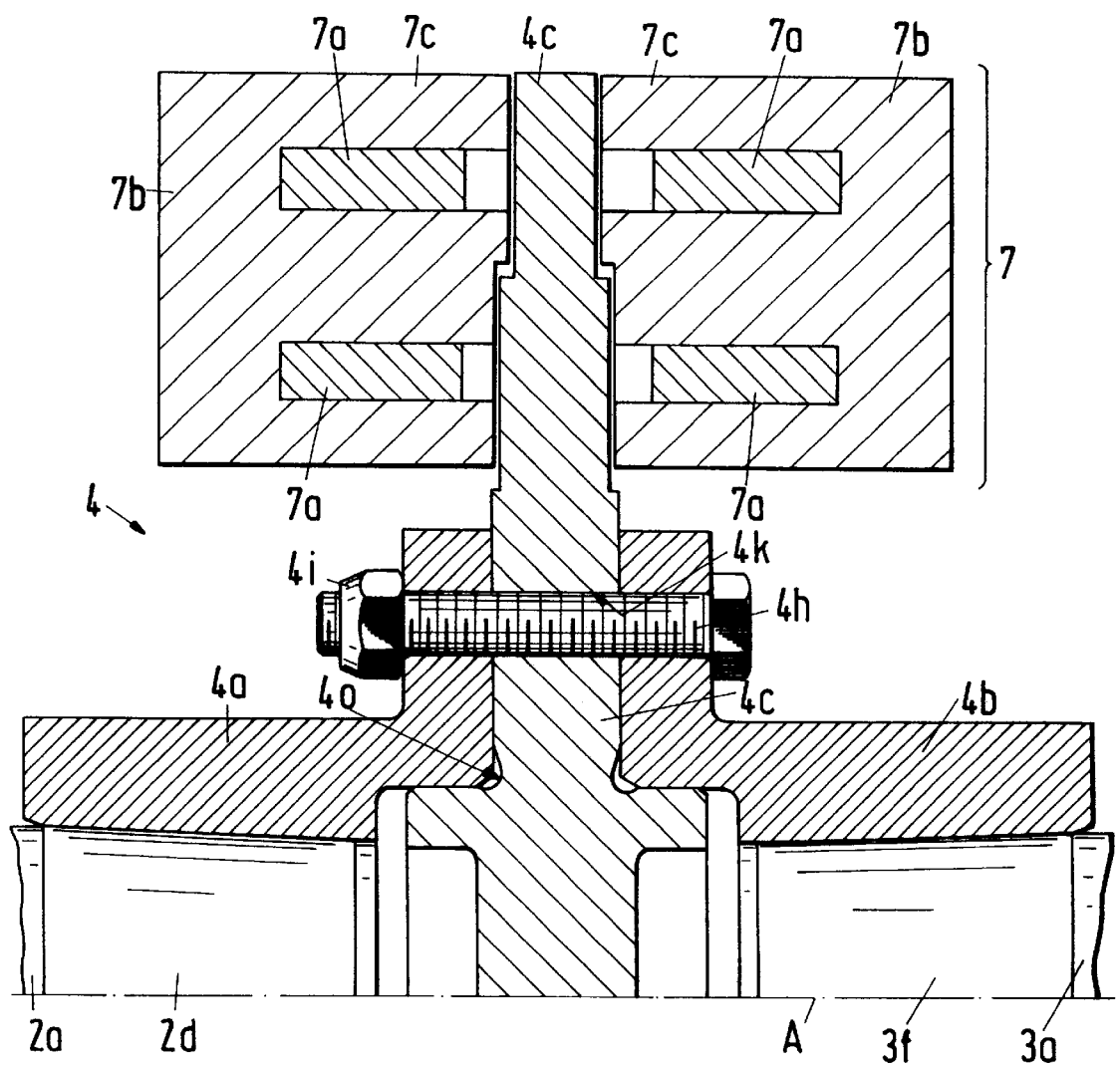
FIG. 2 is a longitudinal sectional view through a coupling apparatus.
Figure 5:
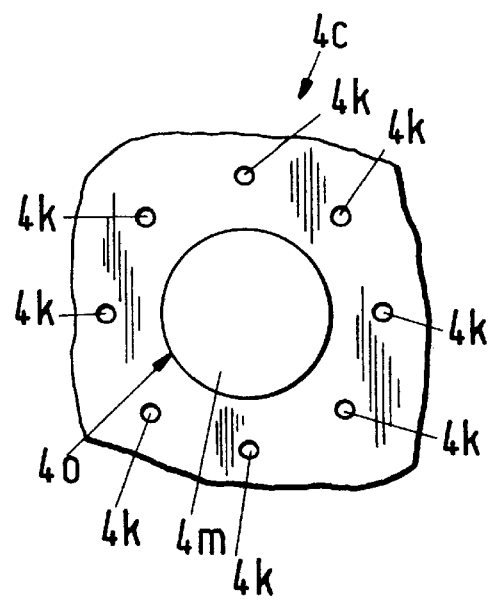
FIG. 5 is a side view of the bearing disc in accordance with FIG. 4.

The longitudinal section through the coupling apparatus 4 which is illustrated in FIG. 2 shows the motor shaft 2a with conically extending end section 3d as well as the shaft 3a of the radial turbocompressor 3 with conically extending end section 3f, which are rotationally fixedly connected to one another with the coupling apparatus 4. The first coupling part 4a is shrunk on onto the end section 2d of the motor shaft 2a and is firmly connected to the latter in this manner. The second coupling part 4b is shrunk on onto the end section 3f of the shaft 3a and is firmly connected to the latter in this manner. The third coupling part 4c, which is formed as a full disc, is clamped in between the first and the second coupling part 4a, 4b. The coupling part 4c has, as can be seen in the side view in accordance with FIG. 5, a plurality of bores 4k which are arranged with spacing in the peripheral direction; and the first and the second coupling part 4a, 4b has bores which are arranged to be correspondingly matched so that, as illustrated in FIG. 2, the three coupling parts 4a, 4b, 4c, are held together in each case by a common screw 4h with nut 4i. Preferably 6, 8 or 12 screws 4h with nuts 4i of this kind are regularly arranged with spacing in the peripheral direction of the coupling apparatus 4 in order to hold the three coupling parts 4a, 4b, 4c together and to transfer the required torque. The third coupling part 4c forms at the same time the bearing disc of the axial bearing 7. Along the section 41 of the bearing disc 4c which projects beyond the first or second coupling part 4a, 4b in the radial direction, electromagnets 7c comprising a laminated soft iron 7b and electromagnetic coils 7a are arranged on both sides in order to cause a force acting in the axial direction A on the bearing disc 4c.

Figure 3:
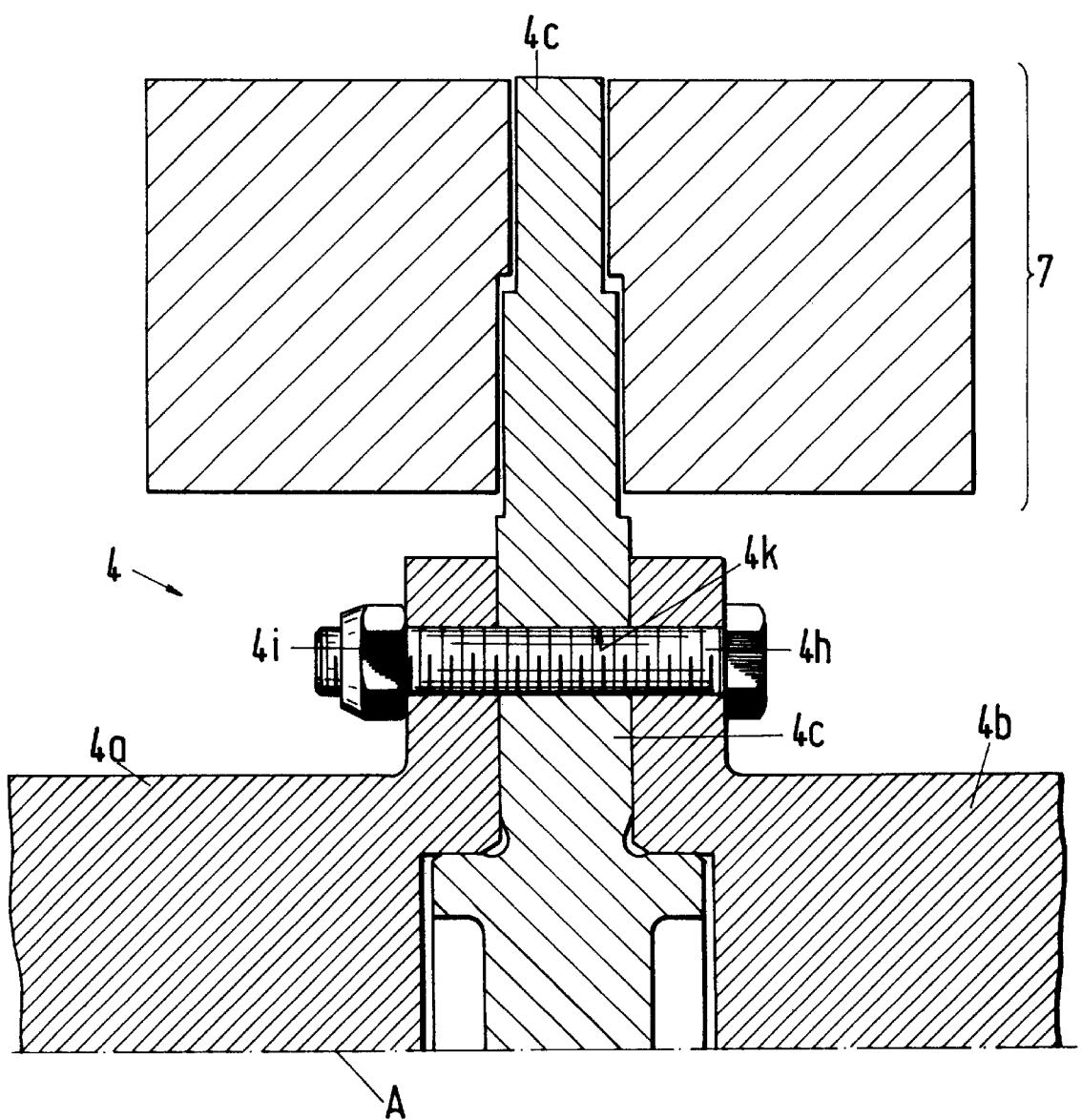
FIG. 3 is a longitudinal sectional view through a further coupling apparatus.

FIG. 3 shows in a longitudinal section a further exemplary embodiment of a coupling apparatus 4, with the ends of the motor shaft 2a and the shaft 3a being formed as coupling flanges 4a, 4b which are rotationally fixedly connected together with the third coupling part 4c by means of screws 4h, 4i. The details of the axial bearing 7, such as electromagnets 7c and coils 7a, are not illustrated, but can be designed as illustrated in FIG. 2.

Figure 4:
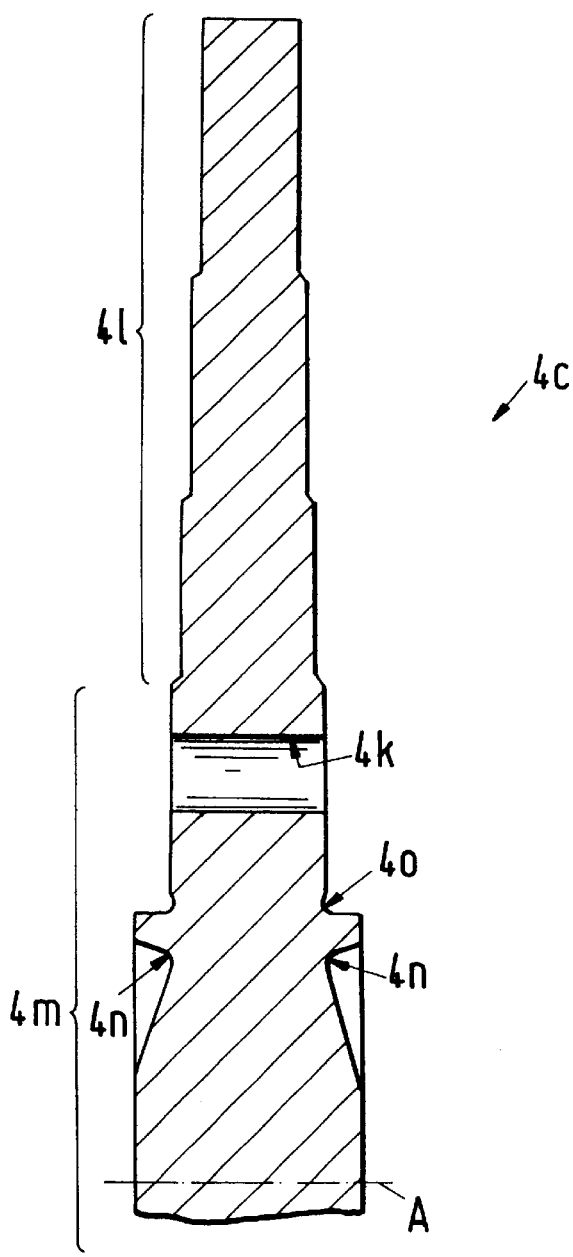
FIG. 4 is a longitudinal sectional view through the bearing disc of an axial bearing.

FIG. 4 shows in a longitudinal section a further exemplary embodiment of a third coupling part 4c or of a bearing disc 4c respectively. The bearing disc 4c comprises an inner disc part 4m which is clamped in between the first and second coupling part 4a, 4b and an outer disc part 41 along which the electromagnets 7c are arranged. Radially to the axial direction A a the outer disc part 41 is designed to become thinner outwardly in order thereby to save on mass. Arranged at the inner disc part 4m is a rounding out 4o which extends in the peripheral direction and which, as seen in FIG. 2, permits a centering of the first and the second coupling part 4a, 4b with respect to the third coupling part 4c. The rounding out 4o also has a rounding out in order to avoid notch stresses. For the same reason a recess 4n which extends in the peripheral direction is arranged in the inner disc part 4m.

The third coupling part 4c is not manufactured by a chip forming method but rather through a reshaping processing, preferably through forging. The term reshaping process is understood to mean a shaping through the application of force and without chip forming machining. After the reshaping process the surface of the worked article can still be machined, for example through grinding or turning. The third coupling part 4c could also have an aperture or bore which is arranged at the center of rotation. Thus the coupling part 4c which is illustrated in FIG. 4 could have an aperture which extends starting from the point represented by 4n up to the center of rotation A. In order to withstand the large centrifugal forces, the third coupling part 4c is however preferably designed as a through-going bearing disc, as is illustrated in FIG. 4. In addition it is preferably observed that the third coupling part 4c has no bore at the center of rotation A, and that at the periphery only few bores are arranged and in addition preferably with bore cross-sections which are as small as possible in order not to or only slightly to reduce the stress resistance of the third coupling part 4c.

The maximum diameter of the coupling part 4c or of the bearing disc respectively is determined by the maximum possible peripheral speed. The bearing disc 4c can for example have a maximum diameter of 50 cm.

The coupling 4 in accordance with the invention has two functions, namely the coupling and the axial journalling of the two shafts 2a, 3a. Since the coupling 4 in accordance with the invention performs both functions the entire shaft, comprising the shafts 2a, 3a and the coupling 4, has a short constructional length. An advantageous oscillation behavior of the entire shaft is achieved through this short constructional length. The short constructional length also has the advantage that the length of the total shaft can be increased in the event for example that this is advantageous for oscillation-technical reasons.

While specific embodiments of the invention have been shown and described in detail to illustrate the application of the principles of the invention, it will be understood that the invention may be embodied otherwise without departing from such principles.

What is claimed is:

1. A coupling apparatus for connecting two rotatable shafts of a turbocompressor, the coupling apparatus comprising:

a first coupling part connected to one of the two rotatable shafts or forming a part of said one of the two rotatable shafts;

a second coupling part connected to the other of the two rotatable shafts or forming a part of said other of the two rotatable shafts;

a third coupling part having a disc-shape and arranged between said first and said second coupling part with said first, said second and said third coupling part being firmly connectable to one another, and with said third coupling part having a section which projects beyond the first or second coupling part in a radial direction to form a bearing disc of an axial bearing, said third coupling part being designed as a disc without a bore at its center.

2. A coupling apparatus in accordance with claim 1, wherein at least the projecting section of the third coupling part is manufactured through a reshaping process.

3. A coupling apparatus in accordance with claim 1, wherein at least the projecting section of the third coupling part is forged.

4. A coupling apparatus in accordance with claim 1, wherein said third coupling part has a plurality of eccentrically arranged bores, arranged on a circular line which extends concentrically relative to the third coupling part.

5. A coupling apparatus in accordance with claim 1, wherein the thickness of said third coupling part decreases radially outwardly.

6. A coupling apparatus in accordance with claim 1, wherein said third coupling part has at least one circular rounding out which extends in a peripheral direction and which is arranged concentrically relative to said third coupling part.

7. A coupling apparatus according to claim 1, wherein: said axial bearing is an electromagnetic axial bearing and includes an electromagnet forming a part of said axial bearing, said electromagnet being arranged adjacent to said third coupling part.

8. A turbocompressor comprising:

a first rotatable turbocompressor shaft;

a second rotatable turbocompressor shaft; and a coupling apparatus including a first coupling part connected to said first rotatable shaft or forming a part of said first rotatable shaft, a second coupling part connected to said second rotatable shaft or forming apart of said second rotatable shaft and a third coupling part having a disc-shape and arranged between said first and said second coupling part with said first, said second and said third coupling part being firmly connectable to one another, and with said third coupling part having a section which projects beyond the first or second coupling part in a radial direction, said third coupling part being designed as a disc without a bore at its center.

9. A turbocompressor in accordance with claim 8, further comprising an axial bearing with said section which projects beyond the first or second coupling part in a radial direction forming a bearing disc of said axial bearing.

10. A turbocompressor according to claim 10, wherein: said axial bearing is an electromagnetic axial bearing and includes an electromagnet forming a part of said axial beating, said electromagnet being arranged adjacent to said third coupling part.

11. A turbocompressor in accordance with claim 8, wherein at least the projecting section of the third coupling part is manufactured through a reshaping process.

12. A turbocompressor in accordance with claim 11, wherein at least the projecting section of the third coupling part is forged.

13. A turbocompressor in accordance with claim 8, wherein said third coupling part has a plurality of eccentrically arranged bores, arranged on a circular line which extends concentrically relative to the third coupling part.

14. A turbocompressor in accordance with claim 8, wherein the thickness of said third coupling part decreases radially outwardly.

15. A turbocompressor in accordance with claim 8, wherein said third coupling part has at least one circular rounding out which extends in a peripheral direction and which is arranged concentrically relative to said third coupling part.

16. A turbocompressor comprising:

a first rotatable turbocompressor shaft;

a second rotatable turbocompressor shaft with at least one radial turbocompressor;

a coupling apparatus including a first coupling part one of connected to said first rotatable turbocompressor shaft or forming a part of said first rotatable turbocompressor shaft, a second coupling part one of connected to said second rotatable turbocompressor shaft or forming a part of said second rotatable turbocompressor shaft and a third coupling part slaving a disc-shape and arranged between said first and said second coupling part with said first, said second and said third coupling part being firmly connectable to one another, and with said third coupling part having a section which projects beyond the first or second coupling part in a radial direction; and an axial bearing formed with said section which projects beyond the first or second coupling part in a radial direction forming a bearing disc of said axial bearing.

17. A turbocompressor according to claim 16, wherein: said axial bearing is an electromagnetic axial bearing and includes an electromagnet forming a part of said axial bearing, said electromagnet being arranged adjacent to said third coupling part.

18. A turbocompressor in accordance with claim 16, further comprising:

a housing surrounding said first and second shafts and said radial turbo compressor;

a plurality of electromagnetic radial bearings arranged between said shafts and said housing.

19. A turbocompressor in accordance with claim 18 wherein:

said housing is a hermetically sealed pressure housing.

20. A tubocompressor in accordance with claim 19, further comprising:

one of an electric motor and another radial turbo compressor arranged on said first shaft.

* * * * *